United States Patent [19]

Wiegand

[11] 3,882,146

[45] May 6, 1975

[54] PROCESS FOR PREPARING PYRRYL-2-ACETONITRILES

[75] Inventor: Karl E. Wiegand, Baton Rouge, La.

[73] Assignee: Ethyl Corporation, Richmond, Va.

[22] Filed: Apr. 30, 1973

[21] Appl. No.: 355,785

[52] U.S. Cl. .......................... 260/326.62; 260/326.2
[51] Int. Cl. ............................................. C07d 27/22
[58] Field of Search ............................... 260/326.62

[56] References Cited
UNITED STATES PATENTS 3,523,952  8/1970  Orth et al. ...................... 260/326.62

*Primary Examiner*—Joseph A. Narcavage
*Attorney, Agent, or Firm*—Donald L. Johnson; John F. Sieberth; James M. Pelton

[57]  ABSTRACT

A process for producing pyrryl-2-acetonitriles by reacting in a homogeneous system a 2-(N,N-dialkylaminomethyl)-pyrrole with an alkylating agent such as dimethylsulfate, methyl iodide or benzyl chloride forming a quaternary salt and reacting the resultant reaction mixture with an aqueous alkali metal cyanide solution such as aqueous sodium cyanide in which the reaction is conducted in a substantially inert solvent selected from oxygen- and nitrogen-containing aliphatic hydrocarbons boiling in the range from about 50° to about 130°C, for example, acetonitrile, tetrahydrofuran, acetone, etc.

4 Claims, No Drawings

PROCESS FOR PREPARING PYRRYL-2-ACETONITRILES

BACKGROUND OF THE INVENTION

It has been known to prepare pyrryl-2-acetonitriles, for example pyrryl-2-acetonitrile and N-methyl-pyrryl-2-acetonitrile, by reacting trimethyl-(pyrryl-2-methyl)-ammonium-iodide or trimethyl-(1-methyl-pyrryl-2-methyl)-ammonium-iodide, respectively, with sodium cyanide. Trimethyl-(pyrryl-2-methyl)-ammonium-iodide and trimethyl-(1-methyl-pyrryl-2-methyl)-ammonium-iodide are formed in known manner by adding methyl iodide to an alcoholic solution of dimethyl-(pyrryl-2-methyl)-amine or dimethyl-(1-methyl-pyrryl-2-methyl)-amine, respectively, see J. Amer. Chem. Soc. 73, 4921 (1951) and J. Amer. Chem. Soc. 75, 483 (1953).

The above mentioned processes have particularly the disadvantage that the ammonium salts prepared from the Mannich bases by reaction with alkyl iodides in absolute alcohol must be isolated prior to their further reaction to the corresponding nitriles. Furthermore, the isolated ammonium compounds decompose easily, whereby the yield of pyrrylacetonitriles is adversely affected.

Another process for producing pyrrylacetonitriles employs a solvent which is not miscible with water, for example benzene and its homologs or halogenated alkanes, for example benzene, toluene, xylene, chlorinated hydrocarbons, such as ethylene chloride, trichloroethylene, perchloroethylene, methylchloroform and the like, see U.S. Pat. No. 3,523,952 to Orth et al. However, this process has the disadvantage of requiring separation of the organic and aqueous phases and extraction of the solvents with the attendant investment and processing costs for such operations.

The disadvantages of the previous processes are overcome by the present invention in which a homogeneous reaction mixture is employed using specific solvents which heretofore have not been recognized as useful in the preparation of pyrrylacetonitriles.

SUMMARY OF THE INVENTION

The present invention is an improvement in a process for producing pyrryl-2-acetonitriles comprising reacting a 2-(N,N-dialkylaminomethyl)-pyrrole with an alkylating agent to form a quaternary salt and further reacting the quaternary salt with an aqueous alkali metal cyanide solution, the improvement comprising conducting the reaction in a homogeneous reaction medium which is a substantially inert solvent selected from the group consisting of oxygen- and nitrogen-containing aliphatic hydrocarbon compounds boiling within the range of from about 50° to about 130°C.

DESCRIPTION OF THE PREFERRED EMBODIMENTS

The compounds prepared by the process of the instant invention have the following general formula:

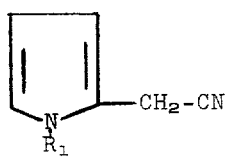
I in which $R_1$ is hydrogen or an alkyl group containing 1–4 carbon atoms.

The starting material for the process of this invention is a Mannich base which is a 2-(N,N-dialkylaminomethyl)-pyrrole compound and corresponds to the general formula:

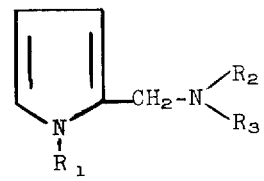
II in which $R_1$ is hydrogen or an alkyl radical having from 1 to about 4 carbon atoms and $R_2$ and $R_3$ are the same or different alkyl radicals containing from 1 to about 4 carbon atoms.

The starting material according to Formula II is converted to the corresponding pyrrylacetonitrile by alkylation to form a quaternary salt and subsequent reaction of the quaternary salt with an alkali metal cyanide.

Alkylation is carried out by reacting the 2-(dialkylaminomethyl)-pyrrole with an alkylating agent. Examples of suitable alkylating agents are alkyl sulfates, such as for example, dimethylsulfate, alkyl halogenides, such as for example, methyl iodide and arylalkyl halogenides, for example, benzyl chloride.

The displacement reaction in which the dialkylamino group is removed as a tertiary amine and replaced with a cyano group is carried out by reacting the quaternary salt formed with aqueous alkali metal cyanide. Examples of suitable displacement agents are sodium cyanide, potassium cyanide, hydrogen cyanide and the like.

The alkylation reaction according to the present invention is carried out homogeneously by proper selection of a suitable reaction medium. Thus, according to the improved process of this invention the alkylation reaction and displacement reaction are both carried out in a reaction medium which has appreciable water solubility. The advantage of using a homogeneous system is that difficult separation and extractions for recovery of product and solvent are not required. Using the process of this invention the reaction medium can be simply distilled off leaving the product as a separate phase which can be easily recovered.

Preferably, the reaction medium is a substantially inert solvent selected from the group consisting of oxygen- and nitrogen-containing aliphatic hydrocarbon compounds. Preferably, the substantially inert solvent boils within the range of from about 50° to about 130°C. Therefore, a particularly preferred reaction medium is a substantially inert solvent selected from the group consisting of oxygen- and nitrogen-containing aliphatic hydrocarbon compounds boiling within the range of from about 50° to about 130°C. Examples of suitable oxygen-containing aliphatic hydrocarbon compounds which can be employed as the solvent according to this invention are ketones and ethers having up to about 10 carbon atoms. Typical of the ethers are compounds such as diethyl ether, dipropyl ether, di-n-butyl ether, di-sec-butyl ether, cyclopropyl ether, allyl ethyl ether, allyl methyl ether, butyl ethyl ether, butyl methyl ether, diallyl ether, di-isopropyl ether, vinyl ether, ethyl isoamyl ether, ethyl isobutyl ether, ethyl isopropyl ether, ethyl propyl ether, isobutyl methyl ether, isopropyl methyl ether, dimethoxy methane, dipropoxy methane, trimethylester of orthoformic acid, tri-isopropylester of orthoformic acid, triethylester of orthoformic acid, 3-ethoxypropyne, 3-methoxypropyne and the like. Suitable ketones are amyl ethyl ketone, amyl methyl ketone, benzyl methyl ketone, butyl methyl ketone, sec-butyl methyl ketone, tert-butyl methyl ketone, diethyl ketone, diheptyl ketone, di-isobutyl ketone, dipentyl ketone, dipropyl ketone, ethyl butyl ketone, ethyl hexyl ketone, ethyl isoamyl ketone, ethyl isobutyl ketone, ethyl isopropyl ketone, ethyl methyl ketone, ethyl octyl ketone, ethyl propyl ketone, hexyl methyl ketone, hexyl propyl ketone, isoamyl methyl ketone, isobutyl methyl ketone, isobutyl propyl ketone, isopropyl methyl ketone, methyl propyl ketone and the like. Suitable nitriles are acetonitrile, propionitrile, butyronitrile, valeronitrile, allyl cyanide, isocapronitrile, isobutyronitrile, α-ethylbutyronitrile, α-methylbutyronitrile, α,α-dimethylproponitrile and the like. Particularly preferred are the oxygen- and nitrogen-containing aliphatic hydrocarbon compounds selected from the group consisting of acetonitrile, tetrahydrofuran, 1,2-dimethoxyethane, acetone, methyl ethyl ketone, methyl isobutyl ketone and methyl butyl ketone. Most highly preferred is acetone.

The alkylation reaction proceeds well at room temperature without the need for heating. The reaction is exothermic and under atmospheric conditions and room temperature cooling of the reaction mixture is required. In contrast, the displacement reaction, in which the quaternary salt is reacted with the aqueous alkali metal cyanide, takes place at temperatures in the range of from about 50° to about 130°C, preferably the reaction is carried out at temperatures of from about 50° to about 100°C, and most preferably from about 60° to about 90°C. Although it is not required, the reaction mixture is preferably agitated as, for example, by stirring the reaction mixture.

Generally, the process for producing pyrryl-2-acetonitriles according to this invention can be carried out in the following manner. The Mannich base is dissolved in the solvent, e.g., acetone, acetonitrile, methyl ethyl ketone or tetrahydrofuran. To this is added an alkylating agent, e.g., dimethylsulfate, benzyl chloride or methyl iodide, forming a quaternary salt. The reaction is slightly exothermic and cooling is required. After the quaternary salt is formed, an aqueous solution of alkali metal cyanide is added to the reaction mixture. Heat is applied to bring the reaction mixture to about 80°–90°C. The displacement of the tertiary amine by the cyanide begins to occur with evolution of the amine and the solvent. The reaction temperature is raised to temperature sufficient to attain good reaction rates and allowed to react until substantially all of the alkali metal cyanide is consumed. The heat is removed and the reaction mixture allowed to cool. The reactor now contains an organic phase and aqueous salt slurry which are separated. The aqueous salt slurry is extracted to obtain any included product and the organic phase is dried and filtered and the drying agent is washed with a suitable solvent and the washings and product combined. The solvent is then distilled leaving a product residue.

The following non-limiting examples illustrate the process of this invention.

EXAMPLE I 209.06 g of 99.2 percent 1-methyl-2-[(N,N-dimethylamino)-methyl]-pyrrole (1.5 mole) was dissolved in 1500 ml of acetone. To this mixture was added 189.2 g (1.5 moles) of dimethylsulfate. The reaction mixture was cooled during addition and stirred. The ice bath was removed after the brief exothermic reaction and the total reaction time was 1½ hours while stirring at room temperature. To the reaction mixture was then added 147.05 g of sodium cyanide (3 moles) dissolved in 326 ml of water. The mixture was heated to 90°C. At this point, acetone began to distill off until the reaction mixture attained 90°C. The temperature of the reaction mixture was raised gradually to 100°C over 1½ hours and maintained an additional one-half hour. At this point, the heat was removed. During the heating, trimethylamine was evolved and continued until the reactor contents cooled below 90°C. The mixture was allowed to cool further to about 50°C and the organic phase was separated from the aqueous salt slurry yielding 170.15 g of wet product. After further cooling, the slurry was extracted twice with 200 ml portions of diethyl ether and the extracts dried over anhydrous sodium sulfate. The extract was then evaporated on a steam bath to give 17.94 g of additional product for total product weight of 188.09 g. Theoretical product weight is 184.76 g. The initially separated wet product was dried also with sodium sulfate and filtered. The drying agent was washed with diethyl ether and washings and product combined. The ether was distilled off on a steam bath leaving a residue of 157.82 g. Total product weight was 175.76 g or 95.13 percent theory. After overnight storage in a refrigerator a sample weighing 170.7 g of product was removed and distilled on a Smith wiped film distillation apparatus. The results of the distillation gave a yield of 2-acetonitrile-N-methylpyrrole of 68.6 percent, and a yield of 1,2-dimethyl-5-cyanopyrrole of 9.2 percent. Total of nitrile yield was 77.8 percent. Total overall yield based on N-methylpyrrole of the desired isomer was 65.5 percent. The distribution of the nitriles was 88.2 percent of 2-acetonitrile-N-methylpyrrole and 11.8 percent of 1,2-dimethyl-5-cyanopyrrole.

EXAMPLE II

To 500 ml of acetone was added 114.6 g (0.908 moles) of 1-methyl-2-[(N,N-dimethylamino)methyl]-pyrrole. To this mixture was added 114.53 g (0.908 moles) of dimethylsulfate over a period of about 30 minutes while cooling the reaction mixture with an ice bath to maintain the temperature below 45°C. The ice bath was removed and after an additional one-half hour a solution of 89.02 g (1.816 moles) of sodium cyanide dissolved in 200 ml of water was added over 15 minutes. The reaction mixture was then heated and the acetone distilled off over a period of about 2 hours. The temperature of the reaction mixture was raised over an additional one-half hour to 90°C while trimethylamine was evolved. The trimethylamine was only partially absorbed in the acetone distillate. During this period, a new organic phase formed on top of the aqueous salt slurry. The reaction mixture was cooled to room temperature and the organic phase separated from the aqueous salt slurry. Appreciable amounts of the organic phase were entrapped in the solid salts. Therefore, an additional 300 ml of water was added to the aqueous phase to dissolve almost all of the solids and the aqueous phase was extracted twice with 100 ml portions of diethyl ether. The ether extracts were combined with the initial organic phase and the combined organic phases were dried with anhydrous sodium sulfate. After drying, the product was removed by decantation and the drying agent washed several times with ether. The ether was then removed under 120 mm Hg pressure at 90°C from the combined washings and the product. The product at this point weighed 102.7 g and contained approximately 7.8 percent ether by NMR analysis. Thus, the product nitrile weight was about 94.9 g. The product contained two isomers, N-methylpyrrole-2-acetonitrile and 1,2-dimethyl-5-cyanopyrrole in a ratio of 85.4 percent to 14.6 percent, respectively, by vapor phase chromatograph. Using the vapor phase chromatograph data, the product nitrile N-methylpyrrole-2-acetonitrile weight was 79.8 g or 0.674 moles. Based on the initial weight of N-methylpyrrole, a 70.6 percent yield is calculated overall.

Similar results can be obtained when the process of the above examples is run using benzyl chloride or methyl iodide as the alkylating agent, or when the alkali metal cyanide is potassium cyanide. Similarly, the acetone of the preceeding examples can be replaced with tetrahydrofuran, 1,2-dimethoxyethane, methyl ethyl ketone, methyl butyl ketone, acetonitrile and the like, as indicated hereinabove, with similar results.

The compounds prepared by the process of this invention can be utilized as starting materials for the preparation of known phenothiazine derivatives which are useful in medicine as anthihistamines, spasmolytica and local anesthetics. Thus, for example, N-methylpyrrole-2-acetonitrile can be converted to a N-methylpyrrole-2-acetic acid ester and the ester reacted to form the phenothiazine derivative 10-[2-(1'-methyl-2'-pyrrolyldyl)-ethyl] phenothiazine which has antihistaminic activity, according to the process described in Orth et al, U.S. patent application Ser. No. 686,286, which is referenced in U.S. Pat. No. 3,523,952 to Orth et al. The N-methyl-pyrrole-2-acetonitriles of this invention may also be used to produce 5-aroyl-2-($\beta$-aminoethyl)-1-loweralkyl-pyrroles, according to Carson, U.S. patent application Ser. No. 5,958, filed Jan. 26, 1970, now U.S. Pat. No. 3,752,826, and referenced in U.S. Pat. Nos. 3,721,680 and 3,707,478. Such compounds possess anti-inflammatory activity as demonstrated in the standard kaolin-induced rat paw edema test or cotton pellet granuloma test, both tests as described in Carson's application, at doses ranging from about 5 to about 100 milligrams per killogram of body weight.

Having described the invention, one skilled in the art can readily envision variations within the spirit and scope of the foregoing disclosure which should be considered non-limiting.

What is claimed is:

1. In a process for producing pyrryl-2-acetonitriles comprising reacting a 2-(N,N-dialkylaminomethyl)-pyrrole with an alkylating agent to form a quaternary salt and further reacting the quaternary salt with an aqueous alkali metal cyanide solution, the improvement comprising carrying out the process homogeneously in a reaction medium which is an inert solvent selected from the group consisting of ketones and ethers having up to about 10 carbon atoms.

2. A process of claim 1 wherein said solvent is acetone.

3. A process of claim 1 wherein said solvent is tetrahydrofuran.

4. A process of claim 1 wherein said solvent is ethyl methyl ketone.

* * * * *